US006638071B2

(12) United States Patent
Stockman (10) Patent No.: US 6,638,071 B2
(45) Date of Patent: Oct. 28, 2003

(54) LANDING GEAR SIMULATOR AND TRAINER

(76) Inventor: Gregg Stockman, 669 Berville Rd., Allenton, MI (US) 48002

( * ) Notice: Subject to any disclaimer, the term of this patent is extended or adjusted under 35 U.S.C. 154(b) by 260 days.

(21) Appl. No.: 09/814,019

(22) Filed: Mar. 21, 2001

(65) Prior Publication Data

US 2002/0182568 A1 Dec. 5, 2002

Related U.S. Application Data (60) Provisional application No. 60/210,276, filed on Jun. 8, 2000.

(51) Int. Cl.[7] .............................................. G09B 9/08
(52) U.S. Cl. .............................. 434/35; 434/29; 434/30
(58) Field of Search ............................ 434/29, 30, 34, 434/35, 37, 4, 43–46, 48, 49, 50, 305, 307 R–309, 365; 244/1 R, 118.5, 223; 340/960, 973–974, 945; 345/710; 701/3, 24, 35, 31; 703/13, 7

(56) References Cited

U.S. PATENT DOCUMENTS

| | | | | |
|---|---|---|---|---|
| 3,815,262 A | * | 6/1974 | Patterson et al. | 434/35 |
| 3,888,019 A | * | 6/1975 | Trabanino | 434/35 |
| 4,078,317 A | * | 3/1978 | Wheatley et al. | 434/43 |
| 4,516,124 A | * | 5/1985 | Shannon et al. | 340/960 |
| 4,599,070 A | * | 7/1986 | Hladky et al. | 434/45 |
| 4,710,128 A | * | 12/1987 | Wachsmuth et al. | 434/46 |
| 4,767,334 A | * | 8/1988 | Thorne et al. | 434/29 |
| 5,111,402 A | * | 5/1992 | Brooks et al. | 701/35 |
| 5,544,842 A | * | 8/1996 | Smith et al. | 244/1 R |
| 6,262,720 B1 | * | 7/2001 | Jeffrey et al. | 345/710 |
| 2002/0022909 A1 | * | 2/2002 | Karem | 701/3 |
| 2002/0099528 A1 | * | 7/2002 | Hett | 703/13 |

* cited by examiner

Primary Examiner—Joe H. Cheng
(74) Attorney, Agent, or Firm—Gifford, Krass, Groh, Sprinkle, Anderson & Citkowski, P.C.

(57) ABSTRACT

A device is disclosed for training pilots by simulating the operation of retractable landing gear in aircraft. The self-contained device can be installed into fixed landing gear aircraft to be used during takeoff and landing. Alternatively, the device can be used during classroom and ground school training. A switch box control panel simulates the landing gear controls and indicators of retractable gear aircraft. A logic circuit and program simulate landing gear operation, in "simulator" mode, and common landing gear errors of retractable gear aircraft in "trainer" mode. In "trainer" mode, the program and circuit also randomly alert the pilot to common landing gear errors and evaluate the pilot's corrective control input, outputting an error indication if the pilot's response is incorrect. The device's capabilities to accept flight control inputs and to emulate characteristics of specific retractable gear aircraft increase the realism of the simulation and training.

5 Claims, 11 Drawing Sheets

| Part | Description |
| --- | --- |
| Batt | Battery pack, nickel-metal hydride 7.2V, 2.1 Amphour |
| C1 | Capacitor 220 uf electrolytic axial |
| C2 | Capacitor .022 uf |
| C3, C4, C5, C6 | Capacitor 100 uf 6V |
| D1, D2, D3, D4 | Diode 1N914 |
| D5 | Diode 1 amp |
| D6 | Diode 3 amp |
| Fuse | Fuse, auto resetting |
| HBZ | Buzzer, high frequency |
| Jack1 | 1/8" Jack, 2 Conductor (closing type) |
| Jack2 | Jack, 2.5 x 5.5 mm |
| L1 & L2 | Lamp Sockets with 3 Green Lamp Caps, 1 Amber Lamp Cap & 4 lights |
| L3 | Push to Test Lamp Assembly, Amber, with Light |
| L4 | Push to Test Lamp Assembly, Green, with Light |
| LBZ | Buzzer, low frequency |
| LED1 | LED, Red |
| Plug1 | 1/8" Plug, 2 Conductor |
| Plug2 | Plug, 2.5 x 5.5 mm |
| PTT | Push to talk type switch with Velcro (normally open) |
| REG | Regulator 9V+, 1 amp |
| RL1, RL2, RL3 | Relay, normally open reed type |
| RL4 | Relay DPDT Reed Type |
| R1 & R2 | Resistor 100K ohm 1/8 watt |
| R3 | Resistor 220 ohm 1/8 watt |
| R4 | Resistor 100K ohm 1/8 watt |
| R5 | Resistor 220 ohm 1/8 watt |
| R6, R7, R8, R9, R10 | Resistor 100K ohm 1/8 watt |
| R11 | Resistor 220 ohm 1/8 watt |
| R12 & R13 | Resistor 4.7k ohm 1/8 watt |
| R14 | Resistor 47k ohm 1/8 watt |
| R15, R16, R17, R18 | Resistor 1K ohm 1/8 watt |
| R19, R20, R21, R22 | Resistor 1K ohm 1/8 watt |
| R23 | Resistor 2 ohm 2 watt |
| R24 | Resistor 1 ohm 1 watt |
| S1 | Switch, SPDT |
| S2 | Switch, SPDT (locking type) |
| S3, S4 | Switch, PC mountable SPST |
| S5, S6 | Switch, normally open push button type |
| T1, T2, T3, T4 | Transistor 2N4401 |
| 12 Volt | Adapter, Cigarette lighter type with 2.5 x 5.5 mm plug |
| 120 Volt | Adapter, 12V .8A output |

LANDING GEAR SIMULATOR AND TRAINER

RELATED APPLICATIONS

This application claims priority of U.S. Provisional Patent Application No. 60/210,276 filed Jun. 8, 2000, which is incorporated herein by reference.

BACKGROUND OF THE INVENTION

I. Field of the Invention

The present invention relates generally to aircraft control simulators and trainers, and particularly it simulates landing gear controls of retractable gear aircraft and trains a pilot by evaluating his response to common landing gear failure scenarios.

II. Description of the Prior Art

Before a pilot can operate an aircraft with retractable landing gear, he or she must receive flight training and a logbook endorsement from a certified flight instructor. On Aug. 4, 1997, the FAA separated the flight training requirements for high performance and retractable gear aircraft. Recently the FAA reversed its stance against flight simulators.

The primary disadvantage to pilot training in retractable landing gear aircraft is the safety risk involved in training in an unfamiliar aircraft. Landing with the gear up exposes the pilot, passengers and the aircraft to risk of harm.

A further disadvantage of prior retractable gear aircraft training methods is the expense incurred by such training. Retractable landing gear aircraft have high purchase, maintenance and insurance costs.

SUMMARY OF THE PRESENT INVENTION

The present invention provides a retractable landing gear simulator and trainer which overcomes all of the above-mentioned disadvantages of the previous methods of training.

In brief, the apparatus of the present invention utilizes a control panel, comprised of switches and lights, which simulates the landing gear controls of a retractable gear aircraft and accepts pilot input. A logic circuit and program indicate landing gear status in "simulator" mode, and randomly generate landing gear faults and evaluate pilot corrective input in "trainer" mode.

The control panel contains a plurality of light and audio indicators to apprise the pilot or trainee of the following: the position of the left, right and nose landing gear; whether the gear is in transit; errors or delays in the pilot's response and a "gear unsafe" condition. The control panel also contains the following switches: a master switch to turn the unit on or off; a gear selector switch to simulate moving the landing gear up or down; an emergency landing gear extension switch and two circuit breakers, one for lights and one for the landing gear pump.

The control panel and the control panel circuit comprise the switch box. The circuit itself is a straightforward logic circuit based on a program which allows it to simulate landing gear operation, randomly generate simulated landing gear errors and evaluate whether the pilot has made the correct response to that error.

The program itself consists of a series of discrete routines for operation of the device in "simulator" mode and in "trainer" mode. When in "trainer" mode, however, the device randomly subjects the pilot to eight different tests based on the routines in the program.

When the device presents the pilot with one of the tests in the program, the pilot must react within a programmed time limit by using the controls of the device. If the pilot does not react within the specified time or inputs the incorrect response, the device will indicate an error by sounding an error tone and illuminating the red error light.

The device also has the capability to accept input from certain flight controls, namely the aircraft tachometer or magneto switch and flaps position indicator or flap lever. These inputs add realism to the simulation by triggering the device to output a "gear unsafe" warning when the power is reduced or the flaps are lowered.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF A PREFERRED EMBODIMENT OF THE PRESENT INVENTION

Figure 1A:
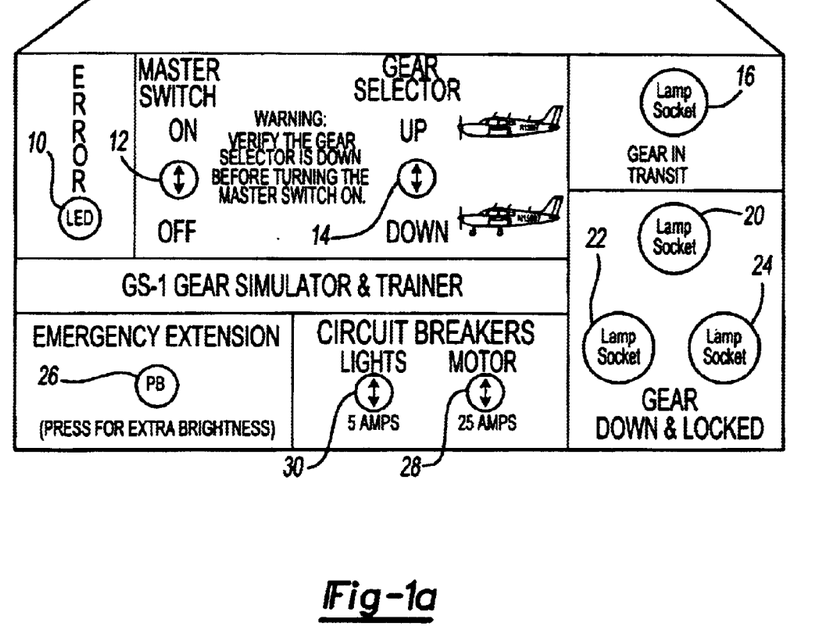
FIGS. 1a and b are a front view of the switch box control panel illustrating a preferred embodiment of the present invention.

FIG. 1a is the pilot's or user's view of the switch box control panel of the present invention. This control panel simulates the landing gear control panel of a retractable gear aircraft and contains all of the indicator lights and switches used by a pilot to monitor and operate that gear along with an error light 10 which indicates an incorrect response to one of the eight tests contained in the "trainer" program. Additionally, the preferred embodiment includes a device capable of producing an audio signal to alert the operator of particular conditions as well as simulate sounds common to the operation of landing gear. Three indicator lights 22, 24, and 20 indicate the down and locked position of the left, right and nose landing gear respectively, and an "in transit" light 16 indicates when the landing gear is in transit, either extending or retracting. The three indicator lights 20, 22, and 24 may be combined using AND logic to emulate aircraft having only one light. The duration of the in-transit indication can be programmed to emulate the extension and retraction time of actual aircraft. The switches on the control panel consist of a master power switch 12 for the present invention, a gear selector up/down switch 14 which simulates the extension and retraction of landing gear, and two circuit breaker switches, one for lights 30 and one for the retractable landing gear pump 28 as well as an emergency gear extension switch 26, which when held down in a correct manner causes the simulated landing gear to extend to the operable landing position.

Figure 1B:
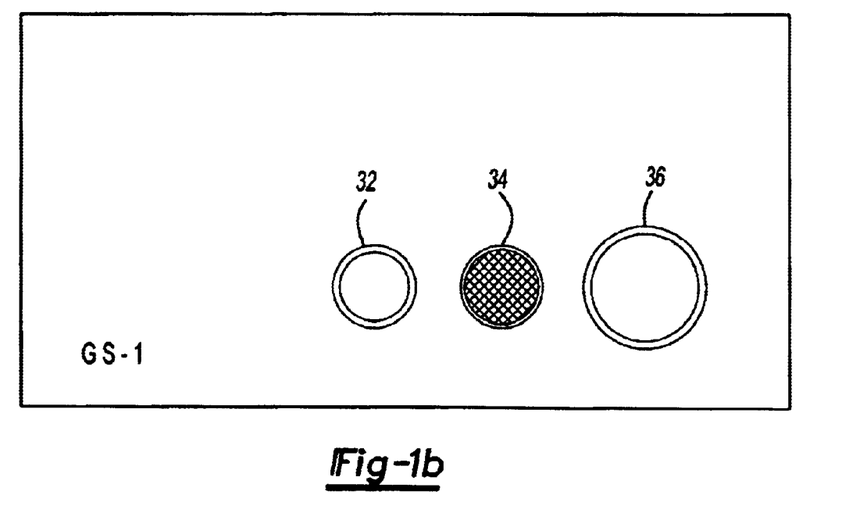

Referring now to FIG. 1*b*, a side panel of the present invention is there shown. A power jack 32 is provided to allow the present invention to be powered by means of a 120 volt AC adapter, 12 volt DC adapter, or the like of which is well known to those skilled in the art. A CFI button (Certified Flight Instructor button) 34 is also provided. The CFI button 34 is pressed by the user in particular circumstances for specific functions which will be described below. In order to enhance the realism of the simulation produced by the present invention, the present invention is capable of interacting with certain gauges of a non-retractable landing gear aircraft such as the flap position gauge and tachometer via the flap switch jack 36.

When in "trainer" mode, the present invention will subject the pilot or user randomly to one of eight different tests as indicated by the illumination pattern of the indicator lights as well as auditory signals. These eight tests are: (1) failure of one of the landing gear to achieve a down and locked status, (2) failure of the gear light circuit breaker, (3) failure of the gear motor circuit breaker during extension, (4) failure of the gear motor or pump, (5) failure of the down and locked light, (6) failure of the gear motor to shut off, (7) failure of the gear motor circuit breaker during retraction, and (8) failure of the gear to fully retract. The device will also indicate an incorrect response or an excessively delayed response by the pilot or user by illuminating the error light 10 on the control panel. In a second embodiment, while in "simulator" mode, the error light 10 will be illuminated and the error tone sounded if the device is turned on with the gear selector 14 in the "up" position. The capability of the device to accept tachometer and flap position inputs from the plane's instrumentation further enhances the realism of the simulation. Changes in aircraft pitch and speed can be induced by operating the first position of the aircraft flaps in conjunction with the gear selector switch 14.

Figure 2:
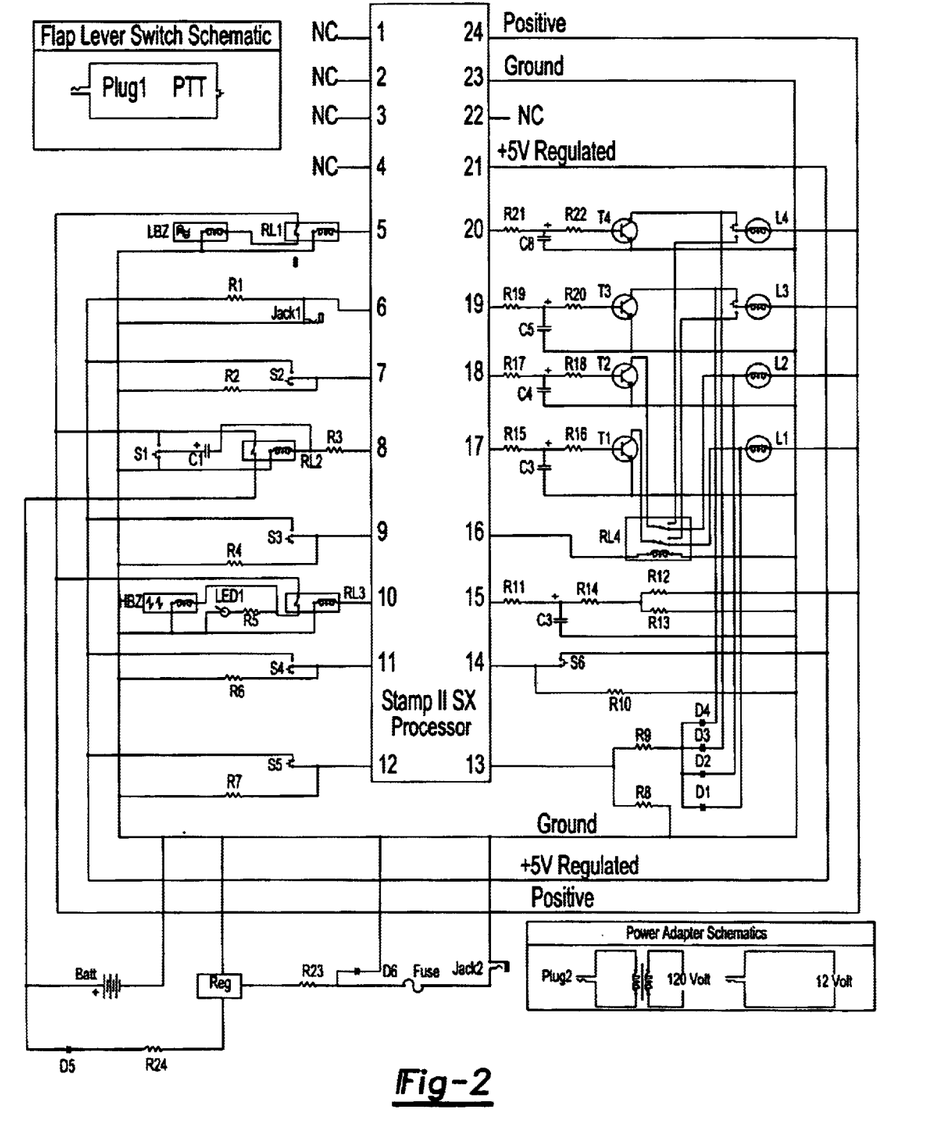
FIG. 2 is a schematic drawing of the device's logic circuit.

FIG. 2 is a schematic drawing of the present invention's logic circuit. This circuit works in conjunction with the flow charted program illustrated in FIGS. 3 through 15 to illuminate the indicator lights based on simulated landing gear position and pilot input. When the device is used in "trainer" mode, the logic circuit and program subject the pilot or trainee to a random sequence of eight predetermined tests as mentioned above. The sequence of tests given to the pilot or trainee is determined as prescribed in the routines "training" and "dts" illustrated in FIGS. 4 and 15 respectively. The logic circuit and program then evaluate the pilot's response through his input via the panel switches.

A part listing for the circuit of FIG. 2 is set forth below:

| Part | Description |
| --- | --- |
| Batt | Battery pack, nickel-metal hydride 7.2 V, 2.1 Amphour |
| C1 | Capacitor 220 uf electrolytic axial |
| C2 | Capacitor .022 uf |
| C3, C4, C5, C6 | Capacitor 100 uf 6 V |
| D1, D2, D3, D4 | Diode 1N914 |
| D5 | Diode 1 amp |
| D6 | Diode 3 amp |
| Fuse | Fuse, auto resetting |
| HBZ | Buzzer, high frequency |
| Jack1 | ⅛" Jack, 2 Conductor (closing type) |
| Jack2 | Jack, 2.5 × 5.5 mm |
| L1 & L2 | Lamp Sockets with 3 Green Lamp Caps, 1 Amber Lamp Cap & 4 Lights |
| L3 | Push to Test Lamp Assembly, Amber, with Light |
| L4 | Push to Test Lamp Assembly, Green, with Light |
| LBZ | Buzzer, low frequency |
| LED1 | LED, Red |
| Plug1 | ⅛" Plug, 2 Conductor |
| Plug2 | Plug, 2.5 × 5.5 mm |
| PTT | Push to talk type switch with Velcro (normally open) |
| REG | Regulator 9 V+, 1 amp |
| RL1, RL2, RL3 | Relay, normally open reed type |
| RL4 | Relay DPDT Reed Type |
| R1 & R2 | Resistor 100K ohm ⅛ watt |
| R3 | Resistor 220 ohm ⅛ watt |
| R4 | Resistor 100K ohm ⅛ watt |
| R5 | Resistor 220 ohm ⅛ watt |
| R6, R7, R8, R9, R10 | Resistor 100K ohm ⅛ watt |
| R11 | Resistor 220 ohm ⅛ watt |
| R12 & R13 | Resistor 4.7 k ohm ⅛ watt |
| R14 | Resistor 47 k ohm ⅛ watt |
| R15, R16, R17, R18 | Resistor 1K ohm ⅛ watt |
| R19, R20, R21, R22 | Resistor 1K ohm ⅛ watt |
| R23 | Resistor 2 ohm 2 watt |
| R24 | Resistor 1 ohm 1 watt |
| S1 | Switch, SPDT |
| S2 | Switch, SPDT (locking type) |
| S3, S4 | Switch, PC mountable SPST |
| S5, S6 | Switch, normally open push button type |
| T1, T2, T3, T4 | Transistor 2N4401 |
| 12 Volt | Adapter, Cigarette lighter type with 2.5 × 5.5 mm plug |
| 120 Volt | Adapter, 12 V .8A output |

Figure 3:
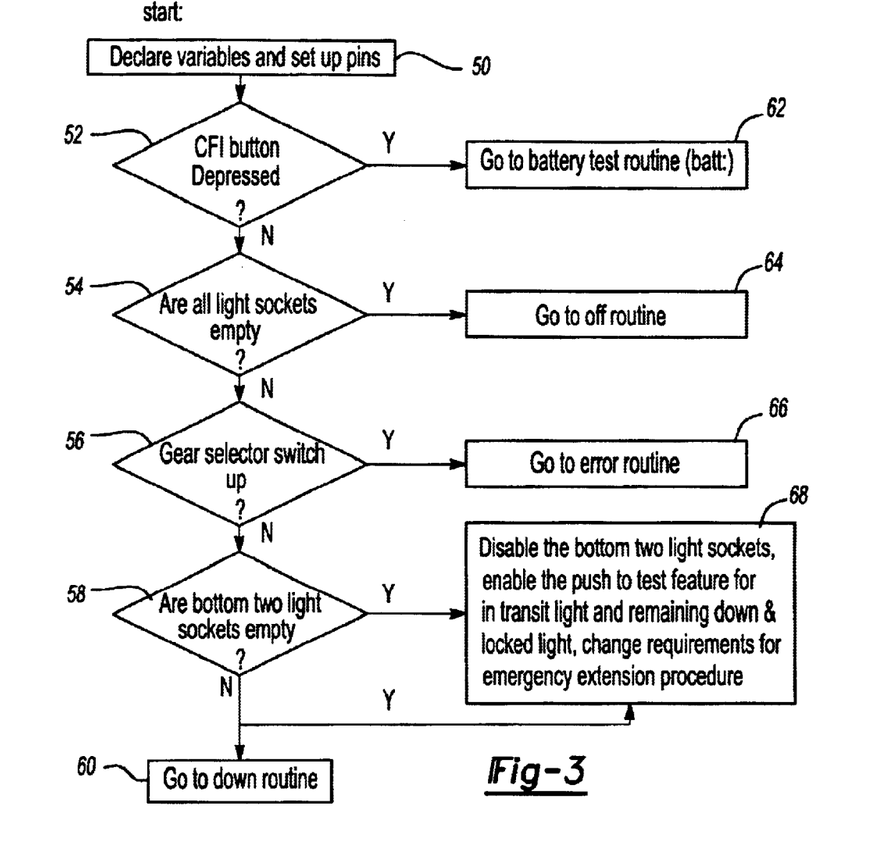
FIG. 3 is a flow chart diagram of the program's "start" routine.

FIG. 3 illustrates the "start" routine whereby the device processor checks its status when the device is turned on and goes to an appropriate routine. Whenever the present invention is turned on by flipping the master switch 12 to the on position, the processor immediately goes to step 50 of the start routine, where all variables necessary for the operation of the present invention in its "simulator" and "trainer" modes are declared and set to initial values.

The processor then proceeds to step 52, where it checks whether the CFI button 34 is depressed. If the CFI button is depressed, the processor branches to step 62 where the subroutine "batt", described in detail below, is called upon.

Alternatively, if the CFI button is not depressed, the processor proceeds to step 54 where it checks if all three of the down and locked lights 20, 22, and 24, are absent from their respective sockets. If the processor determines that none of the lights 20, 22, 24 are in their designated locations, the processor branches to step 64 where the subroutine "off", described in detail below, is called upon.

Conversely, if the lights 20, 22, and 24 are not all found to be absent, the processor proceeds to step 56, where the processor checks the position of the gear selector switch 14. If the gear selector switch 14 is in the up position, the processor branches to step 66, calling upon subroutine "error", described below in detail.

If, however, the gear selector switch 14 is in the down position, the processor proceeds to step 58 where it checks if the left 22 and right 24 down and locked lights are not positioned in their respective sockets. If these two lights 22 and 24 are not present, the processor recognizes that the pilot or trainee wishes to simulate a one-landing-gear-light configuration, and branches to step 68 where the processor disables the left 22 and right 24 down and locked lights, enables the in transit light 16 and nose down and locked light 20 to illuminate when pressed, and alters the requirements for the emergency extension procedure in order to accurately simulate the landing gear operation of such an aircraft. Otherwise, the processor proceeds to step 60 where the "down" routine, described in detail below, is called upon.

Figure 4:
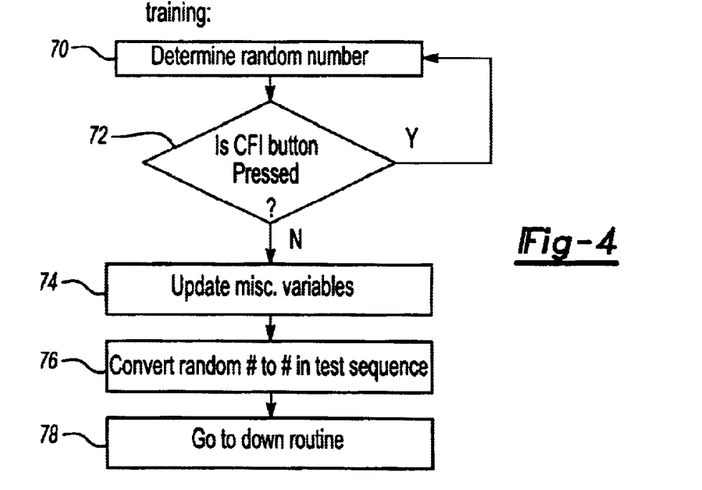
FIG. 4 is a flow chart diagram for the program's "training initialization" routine.

With reference now to FIG. 4, an algorithm, "train", is there shown for initiating the present invention's "trainer" mode. The "trainer" mode is enabled by the CFI button 34 being depressed. At step 70, the processor of the present invention produces a random number.

Proceeding to step 72, the processor checks if the CFI button 34 is depressed. If the CFI button 34 is in fact depressed, the processor reverts back to step 70. Conversely, if the CFI button 34 is not depressed, the processor proceeds to step 74, where variables are appropriately updated.

Further, the processor continues to step 76, where the random number produced in step 70 is used to determine the sequence in which the eight tests in the training mode will be run. The processor then advances to step 78 where the "down" subroutine is called upon.

Figure 5:
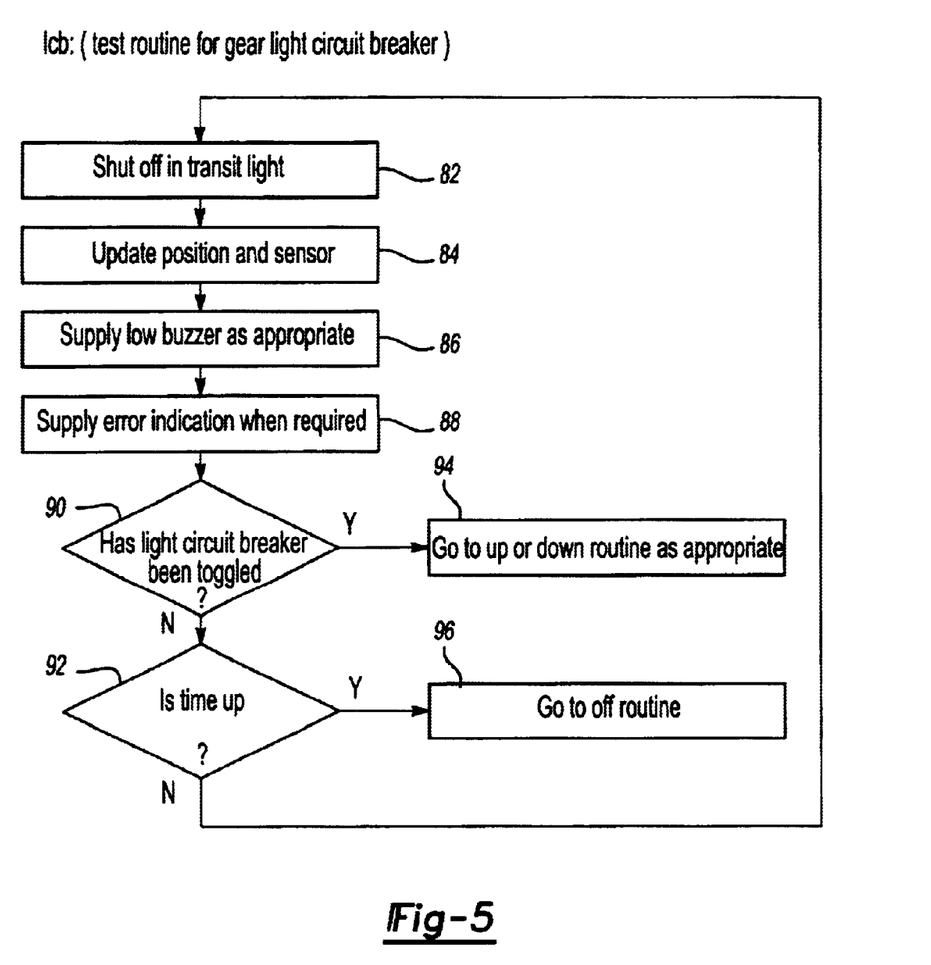
FIG. 5 is a flow chart diagram for the program's "lcb" routine.

In reference now to FIG. 5, an algorithm, "lcb" is there shown, which is called upon in the present invention's "trainer" mode in the performance of test #2, simulating a failure of the gear light circuit breaker 30. In the performance of this algorithm, the processor starts at step 82, where the in transit light 16 is turned off. The processor advances to step 84 where the position of the landing gear as well as the timer, utilized to require the pilot or trainee to respond appropriately in a timely fashion in order to pass the test as well as to operate the device's automatic shut off feature, are updated appropriately.

The processor then continues to step 86 where a low frequency audio signal is caused to emit from the present invention if the conditions of the switches deem it appropriate. Then at step 88, the processor illuminates the error light 10 if too much time has lapsed without a correct response being performed.

The processor next advances to step 90 where the processor checks if the light circuit breaker 30 has been toggled, i.e. the correct response for this particular "trainer" mode test. If the light circuit breaker 30 has been toggled, the processor branches to step 94, where either the down routine or up routine, depending on the position of the gear selector switch 14, is called upon.

Alternatively, if the circuit breaker has not yet been toggled, the processor proceeds to step 92, where the processor determines whether a predetermined period of time has elapsed since any switches or buttons have been depressed. If a sufficient amount of time has elapsed, the processor branches to step 96, where the "off" routine is called upon. Otherwise the processor returns to step 82. This loop allows the algorithm depicted in FIG. 5 to properly judge the pilot or trainee's response to test #2 with the steps described above.

Figure 6:
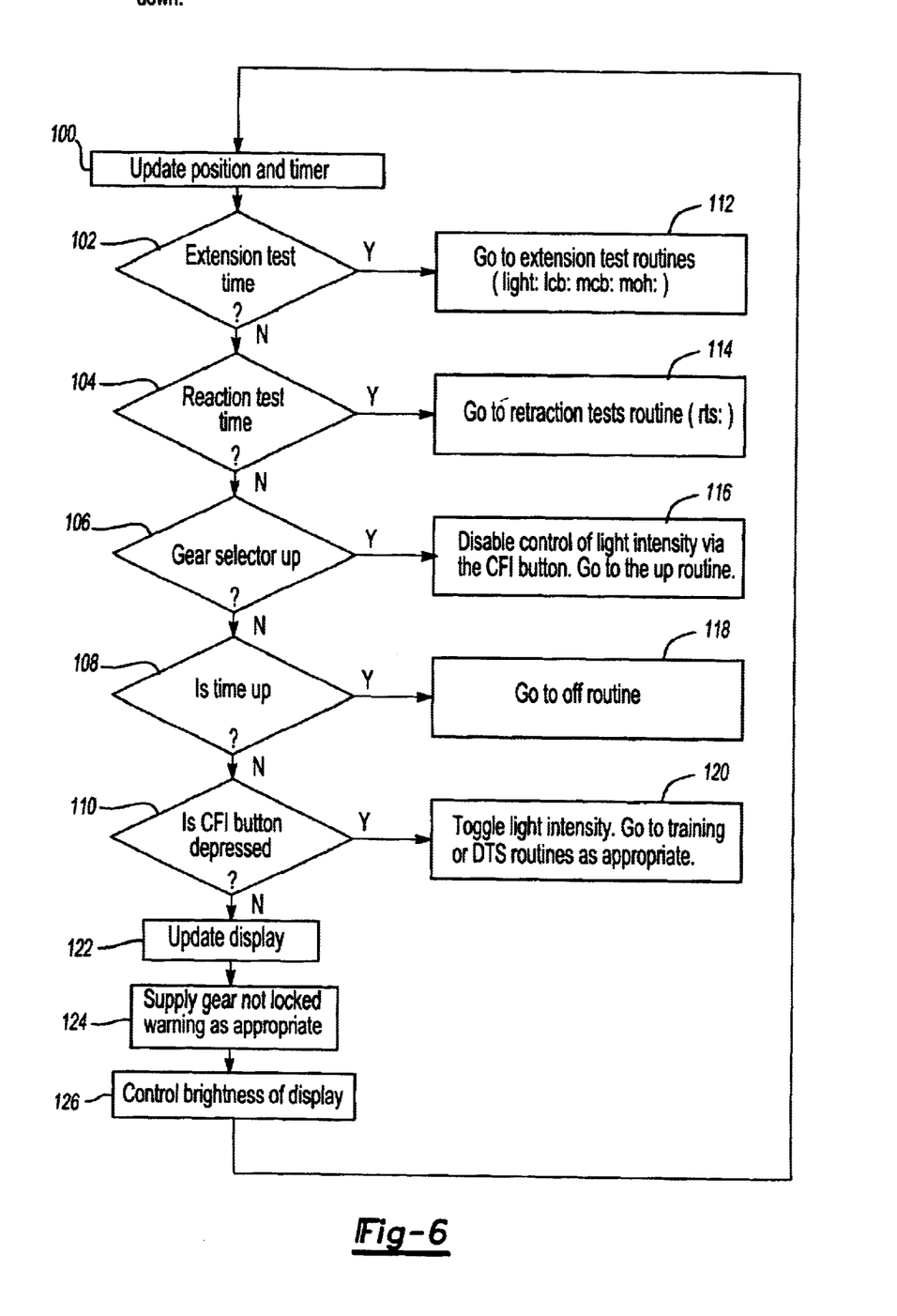
FIG. 6 is a flow chart diagram for the program's "down" routine.

With reference now to FIG. 6, the "down" routine algorithm is there shown, according to which the present invention operates while the gear selector switch 14 is in the down position. In normal operation, the "down" routine is called upon immediately after the present invention is turned on, according to the "start" routine. In order for the "down" routine to complete its loop however, the gear selector switch 14 must be in the down position.

When the "down" routine is called upon, the processor begins with step 100 where the timer is updated along with the simulated position of the landing gear. The processor then goes to step 102 where it determines whether the present invention is operating in "trainer" mode, and if so, whether the administration of one of the gear extension tests is appropriate. If such an administration is appropriate, the processor branches to step 112 where the appropriate gear extension test algorithm, e.g. "light", "lcb", "moh", or "mcb", determined by the sequence which is set up according to the random number produced in the "train" routine, is called upon. Alternatively, if the administration of a gear extension test is not appropriate, the processor advances to step 104, where it similarly determines whether the administration of a gear retraction test is appropriate. If so, the processor branches to step 114 where the subroutine "rts", described in detail below, is called upon.

Conversely, if the administration of a retraction test is not desired, the processor instead branches to step 106, where the position of the gear selector switch 14 is confirmed. If the gear selector switch 14 is in the up position, the processor moves to step 116 where future control of light intensity is disabled, followed by the processor proceeding to the "up" routine, described in detail below, is called upon.

If however, the gear selector switch 14 is in fact in the down position, the logic of the "down" routine continues to step 108 where the processor checks if a predetermined time has lapsed since some user input was supplied. If this predetermined amount of time has elapsed, the processor branches to step 118 where the present invention shuts itself off according to the "off" routine, detailed below.

Alternatively, if the predetermined amount of time has not yet expired, the processor moves to step 110, where the position of the CFI button 34 is detected. If the CFI button 34 is depressed, the pilot or trainee's command is responded to by the processor branching to step 120, where either the routine "train", described above, or the routine "dts", described below, is called. In such an instance, light intensity will be toggled between the high and low setting if the gear selector switch 14 has not been moved since startup. Conversely, if the gear selector switch has been moved since startup, "train" would be called upon if the present invention was not in "trainer mode", whereas "dts" would be utilized if the present invention was already in "trainer mode".

If the CFI button 34 is not depressed, the processor advances to step 122, where the display of the present invention, i.e. the lights illustrated in FIG. 1a, is updated accordingly. Then at step 124 a warning signal is produced if the simulated landing gear is not in the locked extended position.

Finally, at step 126 the brightness of the lights of the display are adjusted if necessary, before the processor returns to step 100, thus completing the loop of the "down" routine.

Figure 7:
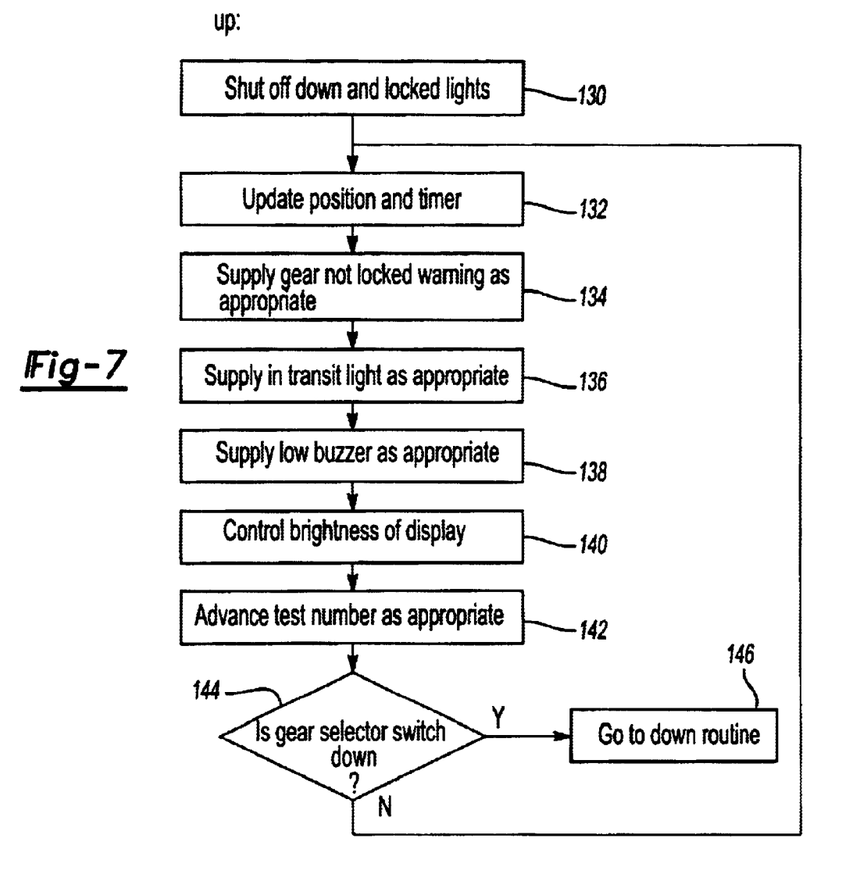
FIG. 7 is a flow chart diagram for the program's "up" routine.

With reference now to FIG. 7, the "up" routine algorithm is there shown, according to which the present invention operates while the gear selector switch 14 is in the up position. Unlike the "down" routine described above, in order for the "up" routine to be called upon in any other routine, the gear selector switch 14 must be in the up position.

The algorithm of the "up" routine depicted in FIG. 7 begins at step 130 where the three down and locked lights 20, 22, and 24 are made not to be illuminated. Similarly to that performed in the "down" routine at steps 100 and 124 respectively, the "up" routine moves to step 132 where the processor updates the timer and the simulated position of the landing gear, and then continues to step 134 where a warning signal is produced if the simulated landing gear is not in the locked extended position.

The processor then advances to step 136 where the in transit light 16 is illuminated or turned off if appropriate. Such an illumination of the in transit light 16 would occur over a few seconds, so as to simulate the extension of the landing gear of an aircraft. Additionally, the processor moves on to step 138 where a low frequency audio signal is provided if appropriate. Such an audio signal in this instance could emulate the sound one would hear during the extension of the landing gear of a retractable landing gear aircraft.

Similarly to that done in step 126 of the "down" routine, the processor continues to step 140, where the brightness of the display is adjusted if necessary. The processor then goes to step 142. At step 142, if the present invention is in "trainer" mode and the present test has been completed successfully by the trainee, the test number is advanced and the next test in the determined succession is administered.

The processor then proceeds to step 144. If the gear selector switch 14 is detected to be in the down position, indicating that this switch 14 has been flipped since the last pass through the loop of the "up" routine, the processor branches to step 146, at which the "down" routine is called upon. Alternatively, if the gear selector switch 14 is still in the up position, the processor returns to step 132.

Figure 8:
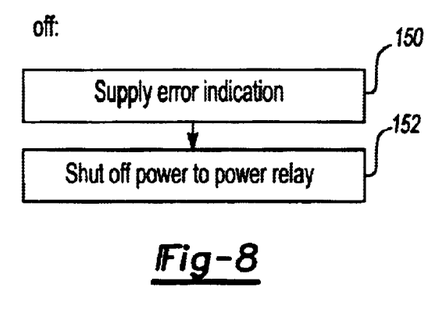
FIG. 8 is a flow chart diagram for the program's "off" routine.

With reference now to FIG. 8, the "off" routine of the present invention is there shown. The "off" routine, activated when no input from the pilot or trainee has been detected over a predetermined amount of time, shuts off the present invention by eliminating its power supply. Beginning at step 150, the processor supplies an error indication such as the error light 10 being illuminated briefly, just before the processor advances to step 152, at which the supply of electrical power to the power relay is interrupted.

Figure 9:
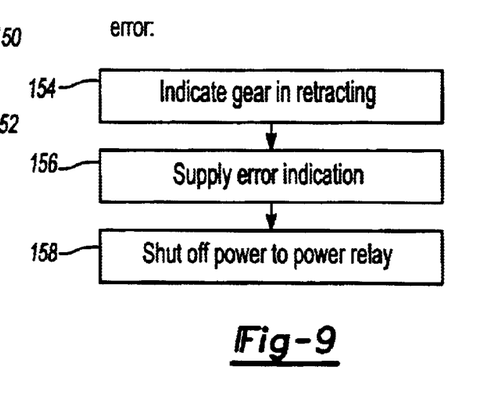
FIG. 9 is a flow chart diagram for the program's "error" routine.

Referring now to FIG. 9, an algorithm, hereinafter referred to as the "error" routine, is represented. The "error" routine is called upon in the "start" routine if the gear selector switch 14 is in the up position when the device is turned on. Because the landing gear of an aircraft should not be retracted when the airplane is first started, such an instance should produce an error indication in a simulator. Additionally, such a condition might cause the logic of the present invention to falter if allowed to go unchecked.

Upon the "error" routine being called, the processor, at step 154, indicates that the simulated landing gear is retracting. The processor then advances to step 156 where the error light 10 is illuminated, just before the processor moves to step 158 and the power is shut off on the device of the present invention.

Figure 10:
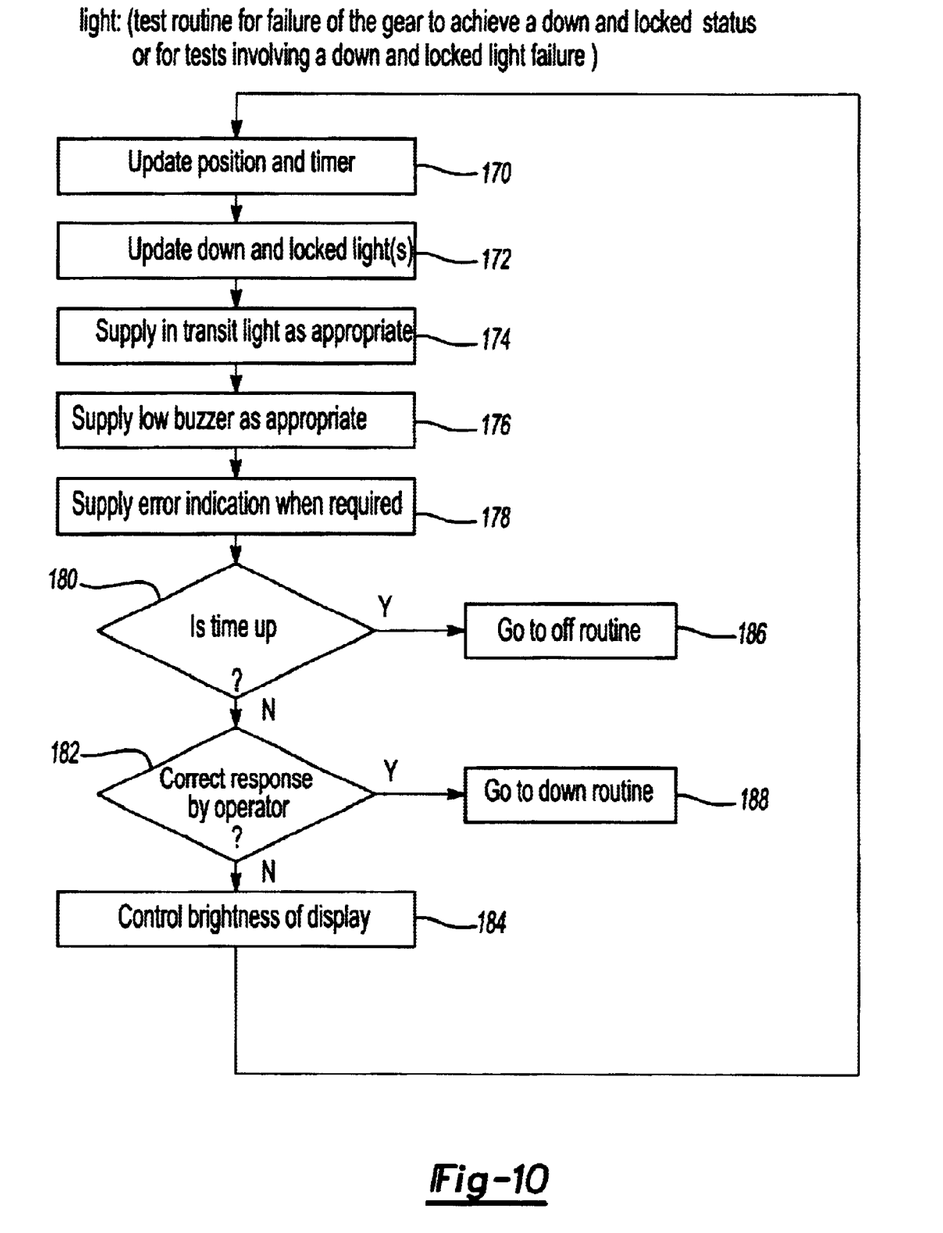
FIG. 10 is a flow chart diagram for the program's "light" routine.

Referring now to FIG. 10, the algorithm for the routine "light", utilized in the administration of test #1 as well as test #5 described above, is there shown. The processor begins at step 170, at which the position of the simulated landing gear and the timer is updated.

Then at step 172, the down and locked lights 20, 22, and 24 are updated. In the preferred embodiment, step 172 entails temporarily disabling the illumination of one of the down and locked lights 20, 22, 24, according to one of the above tests. Such a disabling of one of the lights is intended to simulate either a failure of that particular light or a failure of a particular portion of the landing gear to achieve a down and locked status after being extended.

The processor then advances to steps 174 and 176 and, similarly to steps 136 and 138 respectively in the "up" routine, illuminates the in transit light 16 as appropriate at step 174, and sounds a low frequency audio signal as appropriate at step 176.

The processor then goes to step 178, at which an error indication, such as the error light 10 illuminating, is provided if the pilot or trainee has not yet made a corrective input. The processor further proceeds to step 180, at which the amount of time elapsed since the last pilot input is checked. If this elapsed time is greater than a predetermined amount of time, the processor branches to step 186, at which the "off" routine described in detail above is called, and the present invention is subsequently shut off.

If, however, this time has not passed, the processor continues to step 182. If the pilot or trainee has inputted the correct response for the appropriate test, step 182 branches to step 188, at which the "down" routine is called upon.

Conversely, if the correct response has not yet been entered by the pilot or trainee, the processor goes to step 184 where the brightness of the display is adjusted, as is done in step 140 of the "up" routine and step 126 of the "down" routine. Finally, the processor loops back to step 170, in anticipation of the correct response to be entered or the predetermined time to expire.

Figure 11:
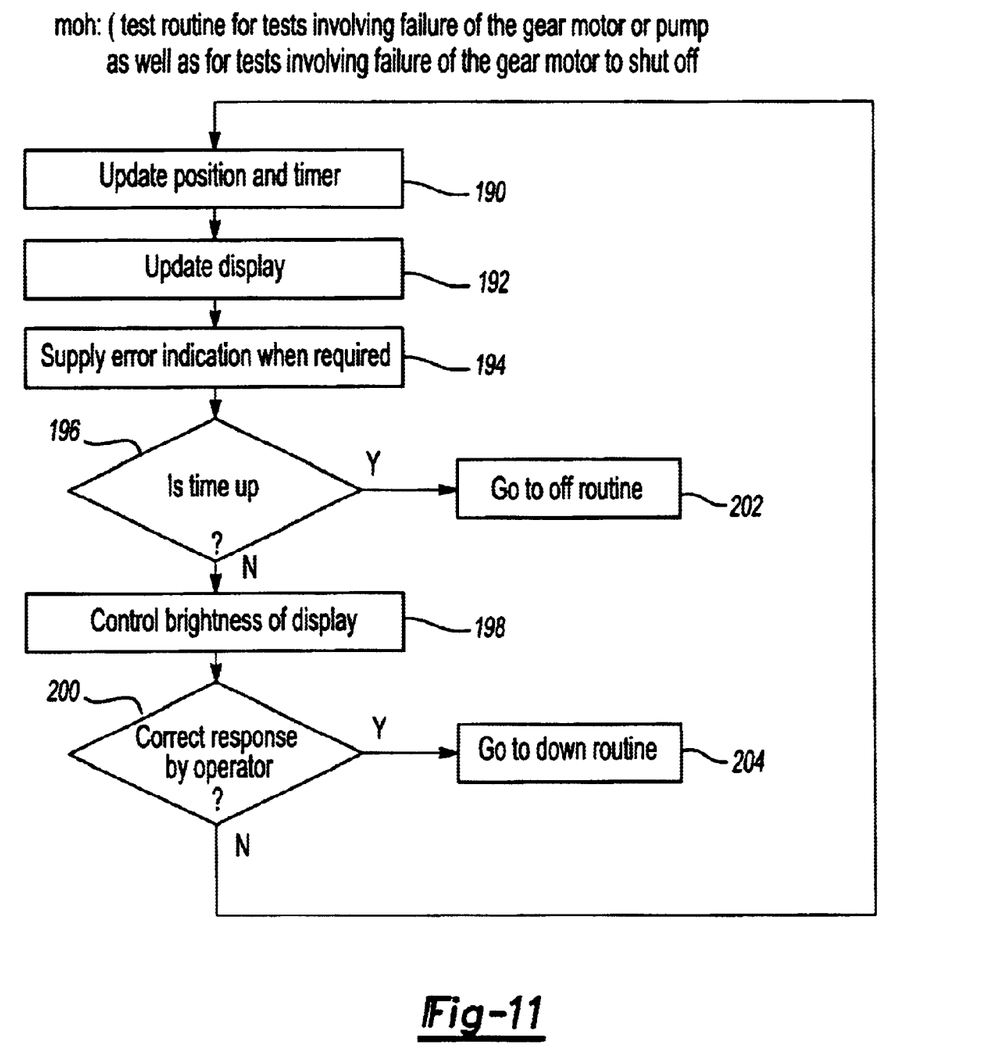
FIG. 11 is a flow chart diagram for the program's "moh" routine.

With reference now to FIG. 11, the algorithm for the routine "moh", utilized in the administration of test #4 as well as test #6 described above, is there shown. The processor begins at step 190, at which the position of the simulated landing gear and the timer is updated based on the motor circuit breaker and the emergency extension switch.

Then at step 192, the display is updated appropriately, e.g. the down and locked lights 20, 22, and 24 are illuminated if the simulated landing gear is in the extended position. In addition, in order to simulate a gear motor failing to shut off, in accordance with test #6, the present invention produces a low frequency audio signal after the simulated landing gear has been extended and locked and the appropriate down and locked lights 20, 22, and 24 have been illuminated. Alternatively at step 192, in accordance with test #4, an audio signal may not be produced and the down and locked lights 20, 22, and 24 may not illuminate upon simulated extension of the landing gear by operation of the gear selector switch 14.

The processor then advances to step 194, at which an error indication, illumination of the error light 10 in the preferred embodiment, is provided if the trainee fails to respond correctly in a predetermined time.

The processor further proceeds to step 196, at which the amount of time elapsed since the last pilot input is checked. If this elapsed time is greater than a predetermined amount of time, the processor branches to step 202, at which the "off" routine described in detail above is called, and the electrical power provided to the present invention is subsequently cut off.

If, however, this time has not passed, the processor continues to step 198 where the brightness of the display is adjusted, just as is done at step 184 in the "light" routine, step 140 in the "up" routine, and step 126 in the "down" routine. Next the processor advances to step 200. If the pilot or trainee has inputted the correct response for the appropriate test, step 200 branches to step 204, at which the "down" routine is called upon.

Conversely, if the correct response has not yet been entered by the pilot or trainee, step 200 branches back to step 190, and the loop of the "moh" routine is repeated. It can be seen that such repetition will continue until the correct response is entered or a predetermined amount of time expires.

Figure 12:
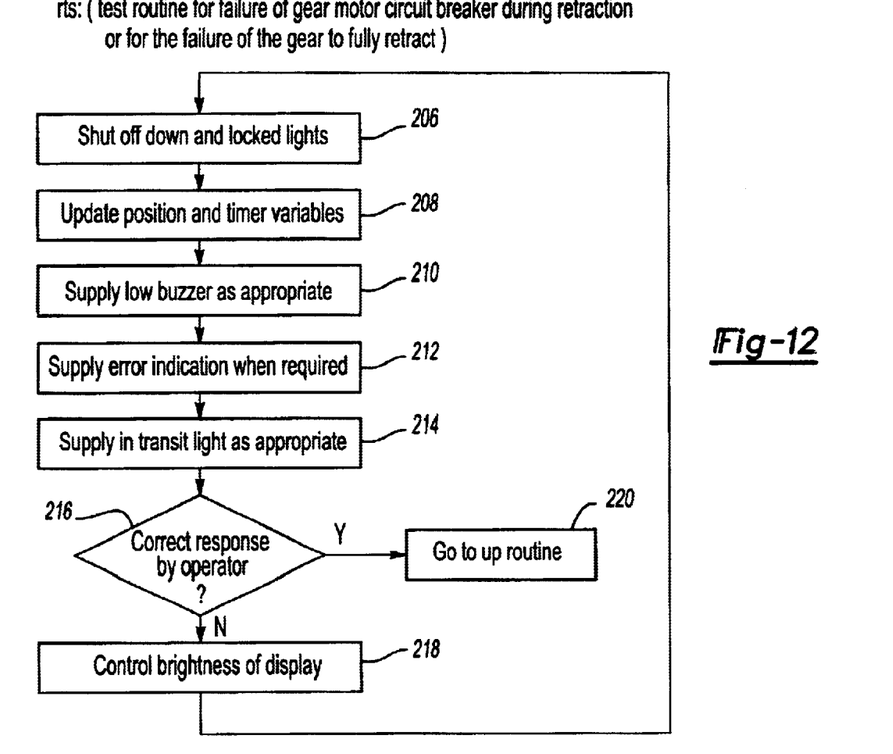
FIG. 12 is a flow chart diagram for the program's "rts" routine.

Referring now to FIG. 12, the algorithm for the routine "rts", utilized in the administration of test #7 as well as test #8 described above, is there shown. The processor begins at step 206 where the down and locked lights 20, 22, and 24 are turned off, so as to simulate the retraction of a landing gear. The absence of illumination of the down and locked lights along with the absence of a low frequency audio signal being produced upon movement of the gear selector switch 14, emulates a gear motor circuit breaker failure on a retractable landing gear aircraft.

The processor continues to step 208, at which the position of the simulated landing gear and the timer is updated. Then the present invention supplies a low frequency audio signal at step 210 if appropriate. Such a signal would obviously not be appropriate if the device is administering test #7.

The processor then goes to step 212, at which an error indication, such as the error light 10 illuminating, is provided if the pilot or trainee has not yet made a corrective input.

The processor then advances to step 214. At step 214, the in transit light 16 is illuminated if appropriate. The in transit light 16 remaining lit for longer than a few seconds emulates what would occur on a retractable landing gear aircraft if the landing gear were unable to fully extend or retract, as is the case in test #8.

The processor further proceeds to step 216. If the pilot or trainee has inputted the correct response for the appropriate test, step 216 branches to step 220, at which the "up" routine is called upon.

Conversely, if the correct response has not yet been entered by the pilot or trainee, the processor goes to step 218 where the brightness of the display is adjusted, as is done in step 140 of the "up" routine and step 126 of the "down" routine. Finally, the processor loops back to step 206, in anticipation of the correct response to be entered. It will be apparent to one skilled in the art that such repetition will continue until the correct response is entered by the trainee.

Figure 13:
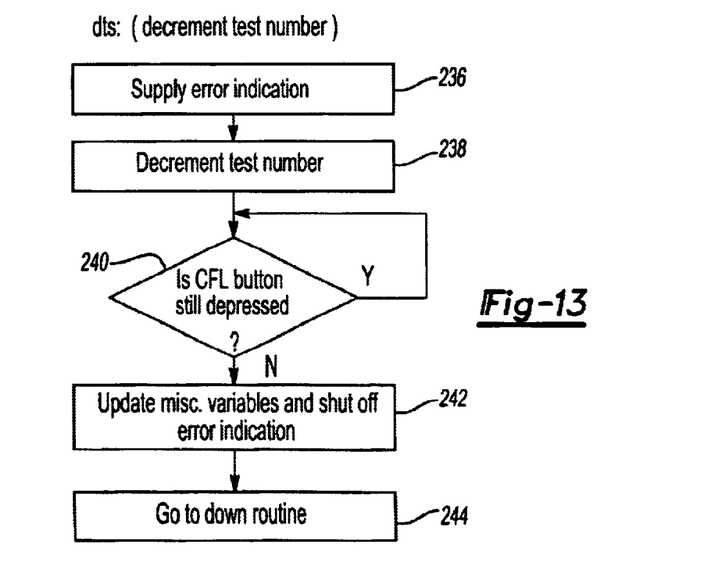
FIG. 13 is a flow chart diagram for the program's "dts" routine.

Referring now to FIG. 13, the algorithm for the "dts" routine is there shown, by which the present invention can respond to the operator's desire to repeat a particular test in the "trainer" mode. In the preferred embodiment, such a desire is indicated by the operator pressing the CFI button 34 while the device is in the "trainer mode".

The processor begins this routine at step 236, at which the error light 10 is illuminated in order to communicate to the operator that his command has been distinguished. The processor then advances to step 238 where the test number is reduced by one.

The processor continues to step 240, checking if the CFI button 34 is still depressed. If the CFI button 34 is found to be depressed, the processor continues to perform step 240 repeatedly, until the CFI button 34 is released by the operator. Upon release of the CFI button 34, the processor moves to step 242. This loop allows the operator to pause the system. Such a pause may be used to facilitate instruction.

At step 242, all variables necessary for the device's operation in "trainer" mode are updated. Additionally, the error light 10 is turned off, thus indicating to the operator that the test number has successfully been changed.

Finally, at step 244, the "down" routine is called. Thus, with the new test number, the test performed immediately prior to the operator pushing the CFI button 34 is administered once again. If however, the operator desires to repeat a test other than that just administered, the "dts" routine can be utilized more than once by the operator pushing and releasing the CFI button 34 repetitively.

Figure 14:
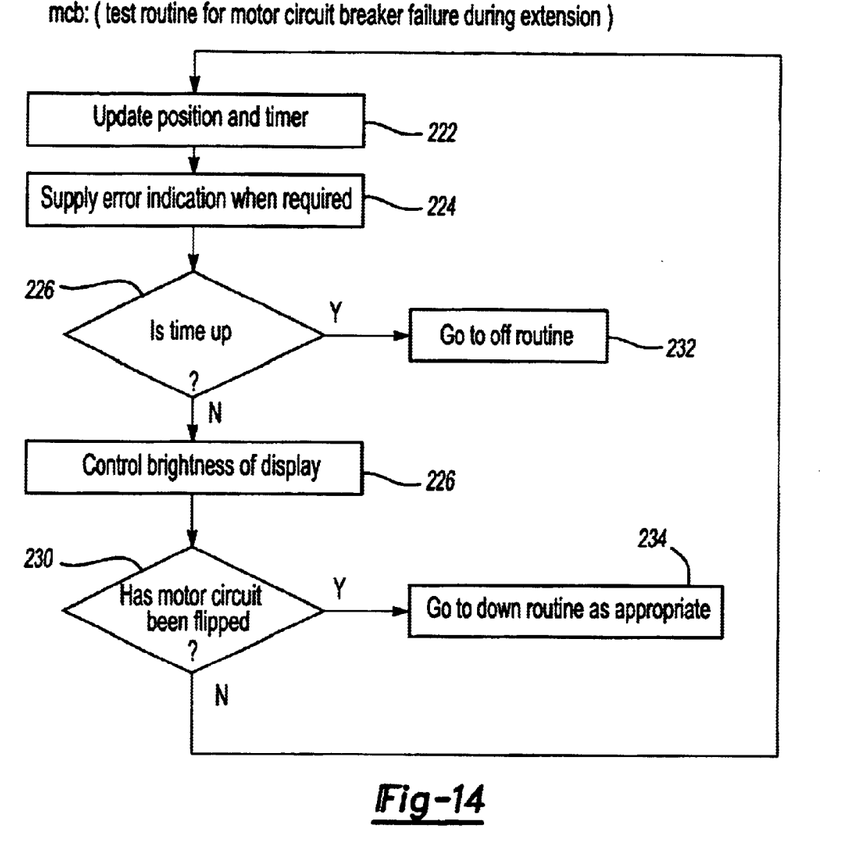
FIG. 14 is a flow chart diagram for the program's "mcb" routine.

With reference now to FIG. 14, the algorithm for the routine "mcb", utilized in the administration of test #3 described above, is there shown. A motor circuit breaker failure during extension of the landing gear, as simulated in test #3, is observed to cause the down and locked lights 20, 22, and 24 to not illuminate and no motor sound to be produced upon moving the gear selector switch 14 to the down position.

The processor begins at step 222, at which the position of the simulated landing gear and the timer is updated based on the motor circuit breaker and the emergency extension switch. Continuing to step 224, an error indication, illumination of the error light 10 in the preferred embodiment, is provided if the trainee fails to respond correctly in a predetermined time.

The processor further proceeds to step 226, at which the amount of time elapsed since the last pilot input is checked. If this elapsed time is greater than a predetermined amount of time, the processor branches to step 232, at which the "off" routine described in detail above is called, and the electrical power provided to the present invention is subsequently cut off.

If, however, this time has not passed, the processor continues to step 228 where the brightness of the display is adjusted, just as is done at step 184 in the "light" routine, step 140 in the "up" routine, and step 126 in the "down" routine. Next the processor advances to step 230. If the pilot or trainee has inputted the correct response, i.e. toggled the pump circuit breaker 28, step 230 branches to step 234, at which the "down" routine is called upon if the simulated landing gear is in the extended position, or the "up" routine is called upon if the simulated gear is in the retracted position.

Conversely, if the correct response has not yet been entered by the pilot or trainee, step 230 branches back to step 222, and the loop of the "mcb" routine is repeated. It can be seen that such repetition will continue until the correct response is entered or a predetermined amount of time expires.

Figure 15:
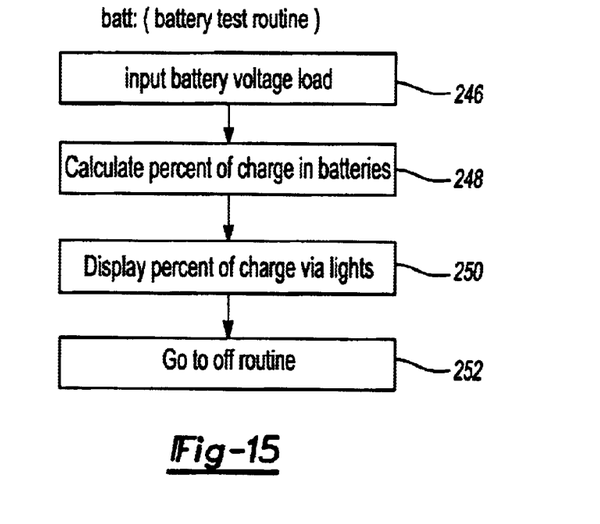
FIG. 15 is a flow chart diagram for the program's "batt" routine.

Finally, referring to FIG. 15, a flow chart of the routine "batt", by which the device determines how much charge the batteries have, and displays this information to the operator, is there shown. Upon initially turning on the device of the present invention, the operator can cause the device to check the level of charge in the batteries which are providing it with power. If the CFI button is depressed when the "start" routine is performed, the processor recognizes that the operator wishes to check the batteries, and thus performs the "batt" routine.

First, the processor goes to step 246, at which the empirical battery voltage is determined by means well known to those skilled in the art. Then at step 248 the percent of charge remaining in the batteries is calculated. The preferred embodiment of the present invention then indicates the level of charge of the batteries by causing one or several of its indicator lights to illuminate or flash at step 250. After such an indication, the processor advances to step 252 where the device shuts itself off by following the steps prescribed in the "off" routine described above.

I claim:

1. A landing gear simulator for pilot training for an aircraft having retractable landing gear comprising:

a housing, at least one electrically activated indicator mounted to said housing, at least one electrical input switch mounted to said housing, a microprocessor based circuit contained in said housing and electrically connected to said indicator and said switch, said circuit being programmed to activate said indicator in response to an input from said switch to randomly simulate a plurality of different malfunction conditions involving activation of the aircraft landing gear, wherein said input switch simulates activation of the aircraft landing gear between an extended and a retracted position.

2. The invention as defined in claim 1 wherein said indicator simulates the position of the aircraft landing gear.

3. The invention as defined in claim 1 wherein said at least one indicator comprises a first indicator light which is activated during simulation of the aircraft landing gear between a retracted and extended position, and at least one second indicator light which is activated upon simulation of the landing gear in an extended and locked position.

4. The invention as defined in claim 3 wherein said at least one second indicator light comprises a left indicator light which is activated upon simulation of the left landing gear in an extended and locked position and a right indicator light which is activated upon simulation of the right landing gear in an extended and locked position.

5. The invention as defined in claim 1 and comprising at least one instrumentation switch mounted to said housing and electrically connected to said circuit, said circuit being programmed so that said instrumentation switch simulates a circuit breaker test for the aircraft.

* * * * *